United States Patent
Wu

(10) Patent No.: US 10,477,424 B2
(45) Date of Patent: Nov. 12, 2019

(54) DEVICE AND METHOD OF HANDLING AGGREGATION OF CELLULAR NETWORK AND WIRELESS LOCAL AREA NETWORK

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 16 days.

(21) Appl. No.: 15/641,311

(22) Filed: Jul. 4, 2017

(65) Prior Publication Data

US 2018/0007732 A1 Jan. 4, 2018

Related U.S. Application Data

(60) Provisional application No. 62/358,060, filed on Jul. 4, 2016, provisional application No. 62/364,334, filed
(Continued)

(51) Int. Cl.
| | | |
|---|---|---|
| *H04W 4/00* | (2018.01) | |
| *H04W 24/10* | (2009.01) | |
| *H04W 72/04* | (2009.01) | |
| *H04W 84/12* | (2009.01) | |
| *H04W 84/04* | (2009.01) | |
| *H04W 88/08* | (2009.01) | |
| *H04W 88/02* | (2009.01) | |

(52) U.S. Cl.
CPC .......... *H04W 24/10* (2013.01); *H04W 72/04* (2013.01); *H04W 84/042* (2013.01); *H04W 84/12* (2013.01); *H04W 88/02* (2013.01); *H04W 88/08* (2013.01)

(58) Field of Classification Search
CPC .......... H04W 72/042; H04W 72/0413; H04W 72/0406; H04W 72/0446; H04L 5/0048
See application file for complete search history.

(56) References Cited

U.S. PATENT DOCUMENTS

| | | | |
|---|---|---|---|
| 2009/0103445 A1* | 4/2009 | Sammour | H04L 1/1812 370/252 |
| 2009/0103478 A1* | 4/2009 | Sammour | H04L 1/1874 370/328 |

(Continued)

OTHER PUBLICATIONS

3GPP TS 36.323 V13.2.1, Jun. 2016.
3GPP TS 36.331 V13.2.0, Jun. 2016.

*Primary Examiner* — Atique Ahmed
(74) *Attorney, Agent, or Firm* — Winston Hsu

(57) ABSTRACT

A communication device of handling aggregation of cellular network and Wireless Local Area Network (WLAN) aggregation (CWA) comprises instructions of transmitting a message indicating support of the CWA to a base station (BS) via a cellular connection; receiving a configuration message configuring the CWA from the BS via the cellular connection; transmitting a cellular protocol data unit (PDU) to a WLAN configured by the configuration message via a WLAN connection; receiving a status report indicating that the cellular PDU is lost from the BS; transmitting the cellular PDU indicated by the status report, when the communication device has the cellular PDU in a memory device of the communication device; and transmitting a cellular message in response to the status report, when the communication device does not have the cellular PDU in the memory device.

13 Claims, 9 Drawing Sheets

Related U.S. Application Data on Jul. 20, 2016, provisional application No. 62/416,715, filed on Nov. 3, 2016.

(56) References Cited

U.S. PATENT DOCUMENTS

| | | | |
|---|---|---|---|
| 2009/0149189 A1* | 6/2009 | Sammour | H04L 1/165 455/450 |
| 2010/0111032 A1* | 5/2010 | Wu | H04W 74/0833 370/331 |
| 2010/0296464 A1* | 11/2010 | Barraclough | H04M 15/00 370/329 |
| 2011/0164664 A1* | 7/2011 | Torsner | H04L 1/0083 375/219 |
| 2011/0299681 A1* | 12/2011 | Kubota | H04W 12/0017 380/247 |
| 2012/0240000 A1* | 9/2012 | Venkataraj | H04L 1/1657 714/751 |
| 2016/0234752 A1* | 8/2016 | Hsu | H04L 12/4641 |
| 2017/0041767 A1* | 2/2017 | Vajapeyam | H04W 28/0205 |
| 2017/0055176 A1* | 2/2017 | Xiao | H04L 5/0055 |
| 2017/0171903 A1* | 6/2017 | Kubota | H04L 41/0672 |
| 2017/0223578 A1* | 8/2017 | Hong | H04L 41/0803 |
| 2017/0374579 A1* | 12/2017 | Wang | H04W 28/08 |
| 2018/0124642 A1* | 5/2018 | Phuyal | H04W 28/08 |
| 2018/0192346 A1* | 7/2018 | Nagasaka | H04W 28/08 |

\* cited by examiner

DEVICE AND METHOD OF HANDLING AGGREGATION OF CELLULAR NETWORK AND WIRELESS LOCAL AREA NETWORK

CROSS REFERENCE TO RELATED APPLICATIONS

This application claims the benefits of U.S. Provisional Applications No. 62/358,060, filed on Jul. 4, 2016, No. 62/364,334, filed on Jul. 20, 2016, and No. 62/416,715, filed on Nov. 3, 2016, which are incorporated herein by reference.

BACKGROUND OF THE INVENTION

1. Field of the Invention

The present invention relates to a communication device and a method used in a wireless communication system, and more particularly, to a communication device and method of handling aggregation of cellular network and wireless local area network in a wireless communication system.

2. Description of the Prior Art

A user equipment (UE) may transmit long term evolution (LTE) data to a base station (BS) via an access point (AP) of a wireless local area network (WLAN), when the UE is configured with LTE-WLAN aggregation (LWA). Then, the UE may consider that the LTE data has been transmitted successfully and may discard the LTE data due to a limited buffer size of the UE. However, the AP may not transmit the LTE data successfully due to certain reasons (e.g., a connection failure in an Xw interface between the BS and the AP). The BS may notify the UE that the LTE data is lost. However, the UE cannot retransmit the LTE data to the BS because the LTE PDU is discarded. Thus, the BS may keep notifying the UE. As a result, unnecessary notification and a deadlock may occur, and LTE radio resource may be wasted.

SUMMARY OF THE INVENTION

The present invention therefore provides a method and related communication device for handling aggregation of cellular network and Wireless Local Area Network (WLAN) (LWA) to solve the abovementioned problem.

A communication device of handling aggregation of cellular network and Wireless Local Area Network (WLAN) (CWA) comprises a storage device for storing instructions and a processing circuit coupled to the storage device. The processing circuit is configured to execute the instructions stored in the storage device. The instructions comprise transmitting a message indicating support of the CWA to a base station (BS) via a cellular connection; receiving a configuration message configuring the CWA from the BS via the cellular connection; transmitting a cellular protocol data unit (PDU) to a WLAN configured by the configuration message via a WLAN connection; receiving a status report indicating that the cellular PDU is lost from the BS; transmitting the cellular PDU indicated by the status report, when the communication device has the cellular PDU in a memory device of the communication device; and transmitting a cellular message in response to the status report, when the communication device does not have the cellular PDU in the memory device.

A communication device of handling aggregation of cellular network and Wireless Local Area Network (WLAN) (CWA), comprises a storage device for storing instructions and a processing circuit coupled to the storage device. The processing circuit is configured to execute the instructions stored in the storage device. The instructions comprise configuring a transmitting window to a Packet Data Convergence Protocol (PDCP) entity of a radio bearer of the radio bearer, when the radio bearer is a CWA bearer.

A communication device of handling aggregation of cellular network and Wireless Local Area Network (WLAN) (CWA) comprises a storage device for storing instructions and a processing circuit coupled to the storage device. The processing circuit is configured to execute the instructions stored in the storage device. The instructions comprise transmitting a message indicating support of the CWA to a base station (BS) via a cellular connection; receiving a configuration message configuring the CWA from the BS via the cellular connection; transmitting a plurality of cellular protocol data units (PDUs) to a WLAN configured by the configuration message via a WLAN connection; receiving a status report indicating that a first cellular PDU of the plurality of cellular PDUs is lost from the BS; transmitting the first cellular PDU indicated by the status report, when the communication device has the first cellular PDU in a memory device of the communication device; and ignoring the first cellular PDU, when the communication device does not have the first cellular PDU in the memory device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
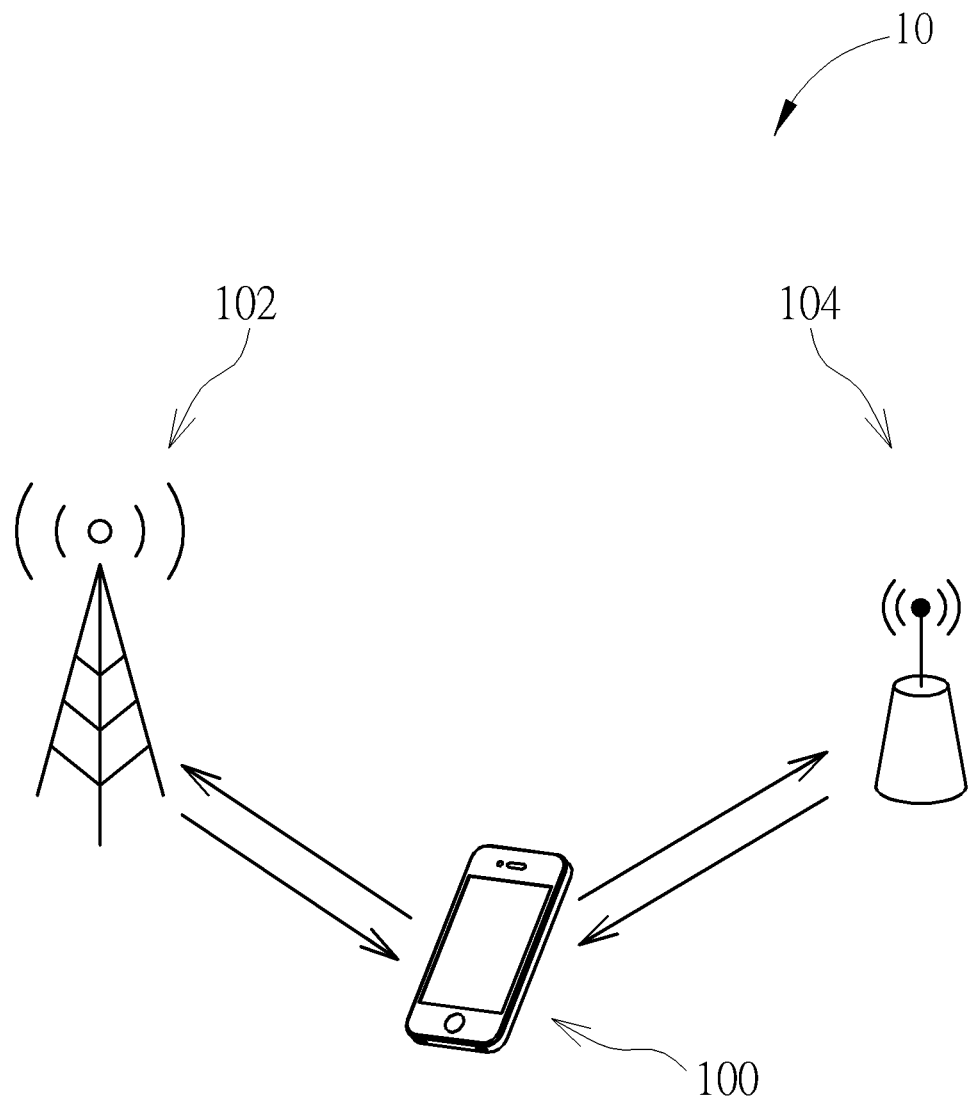
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and an access point (AP) 104. In FIG. 1, the communication device 100, the BS 102 and AP 104 are simply utilized for illustrating the structure of the wireless communication system 10. Practically, the BS 102 may be an evolved Node-B (eNB) in a long term evolution (LTE) system, or a fifth generation (5G) BS in a new radio (NR) system (or called 5G system). The AP 104 may be a network entity in a wireless local area network (WLAN). The communication device 100 and the AP 104 may support Institute of Electrical and Electronics Engineers (IEEE) 802.11 related standards (e.g., IEEE 802.11a/b/g/n/ac/ad/ax).

In FIG. 1, the communication device 100 is configured to communicate with the BS 102 and the AP 104 at the same time according to cellular network-WLAN aggregation (CWA) configured to the communication device 100. The cellular network may be a LTE network or a NR network. That is, the communication device 100 performs a transmission/reception to/from the BS 102 and the AP 104. In addition, the communication device 100 communicates with the BS 102 via one or more radio bearer(s) utilizing the cellular network resource(s) and/or the WLAN resource(s).

The communication device 100 may be a user equipment (UE), a mobile phone, a laptop, a tablet computer, an electronic book, a portable computer system, a vehicle or an aircraft. In addition, for an uplink (UL), the communication device 100 is a transmitter and the BS 102 and AP 104 are receivers, and for a downlink (DL), the BS 102 and AP 104 are transmitters and the communication device 100 is a receiver.

Figure 2:
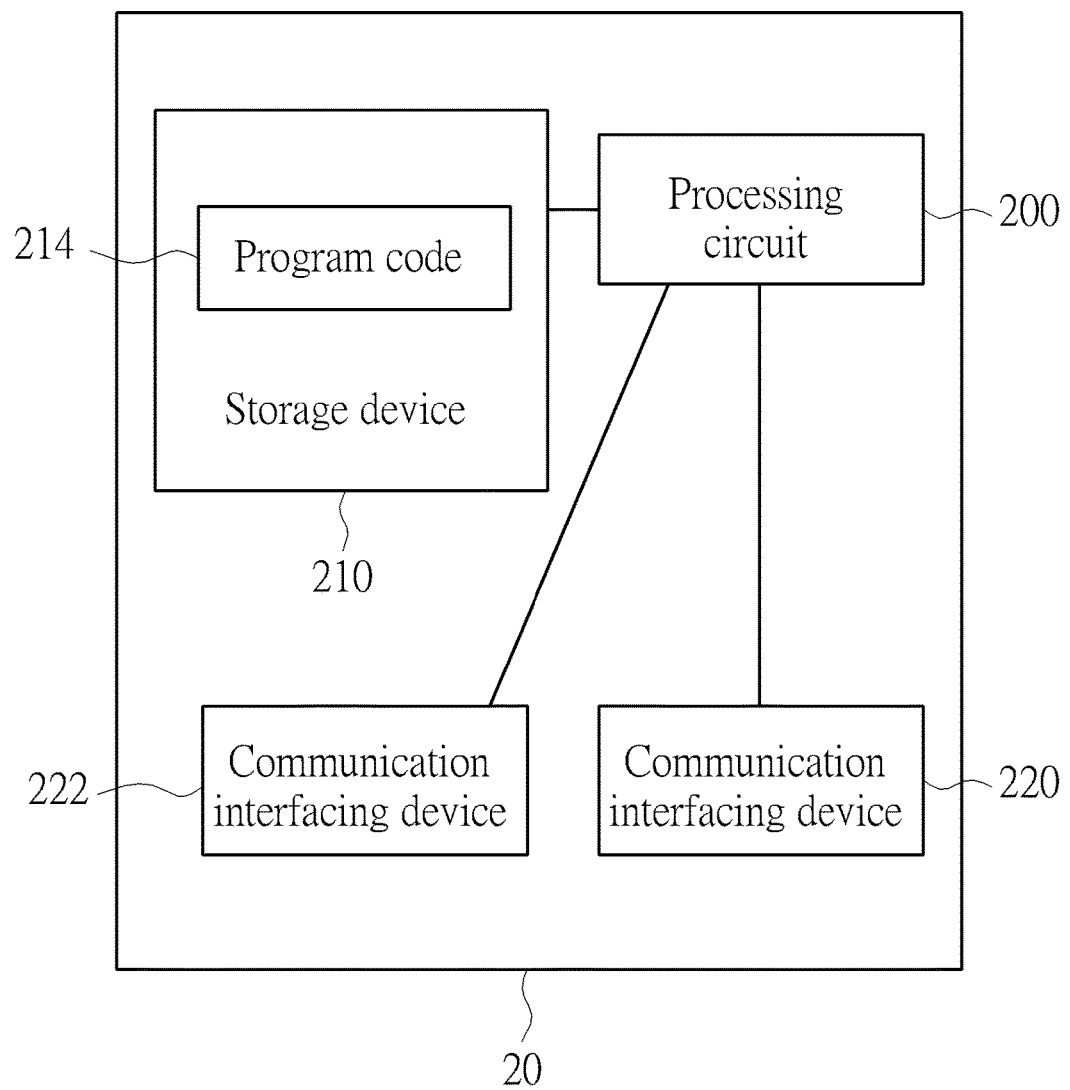
FIG. 2 is a schematic diagram of a communication device according to an example of the present invention.

FIG. 2 is a schematic diagram of a communication device 20 according to an example of the present invention. The communication device 20 may be the communication device 100, the BS 102 or the AP 104 shown in FIG. 1, but is not limited herein. The communication device 20 may include a processing circuit 200 such as a microprocessor or Application Specific Integrated Circuit (ASIC), a storage device 210, a communication interfacing device 220 for LTE/5G transmission/reception, and a communication interfacing device 222 for WLAN (e.g., WiFi) transmission/reception. The storage device 210 may be any data storage device that may store a program code 214, accessed and executed by the processing circuit 200. Examples of the storage device 210 include but are not limited to a read-only memory (ROM), flash memory, random-access memory (RAM), hard disk, optical data storage device, non-volatile storage device, non-transitory computer-readable medium (e.g., tangible media), etc. The communication interfacing device 220 includes a transceiver and is used to transmit and receive signals (e.g., data, messages and/or packets) according to processing results of the processing circuit 200.

In the following examples, a UE is used for representing the communication device 100 in FIG. 1, a BS is used for representing the BS 102, a WLAN or an AP is used for representing the AP 104 in FIG. 1 and LTE-WLAN aggregation (LWA) is used for representing the CWA, to simplify the illustration of the examples.

A bearer for the LWA (i.e., LWA bearer) may be a split LWA bearer or switched LWA bearer. In the DL, for protocol data units (PDUs) transmitted via a WLAN in an LWA operation, an LWA Adaption Protocol (LWAAP) entity in the LTE network generates LWA PDUs including a data radio bearer (DRB) identity and a WLAN termination (WT) uses a LWA EtherType (e.g., 0x9E65) for forwarding data to the communication device via the WLAN. The communication device uses the LWA EtherType to determine that the received PDUs belong to an LWA bearer, and uses the DRB identity to determine to which LWA bearer the received PDUs belongs. In the UL, for PDUs transmitted via the WLAN in the LWA operation, the LWAAP entity in the communication device generates LWA PDUs including a DRB identity and the communication device uses the LWA EtherType for transmitting the PDUs via the WLAN.

Figure 3:
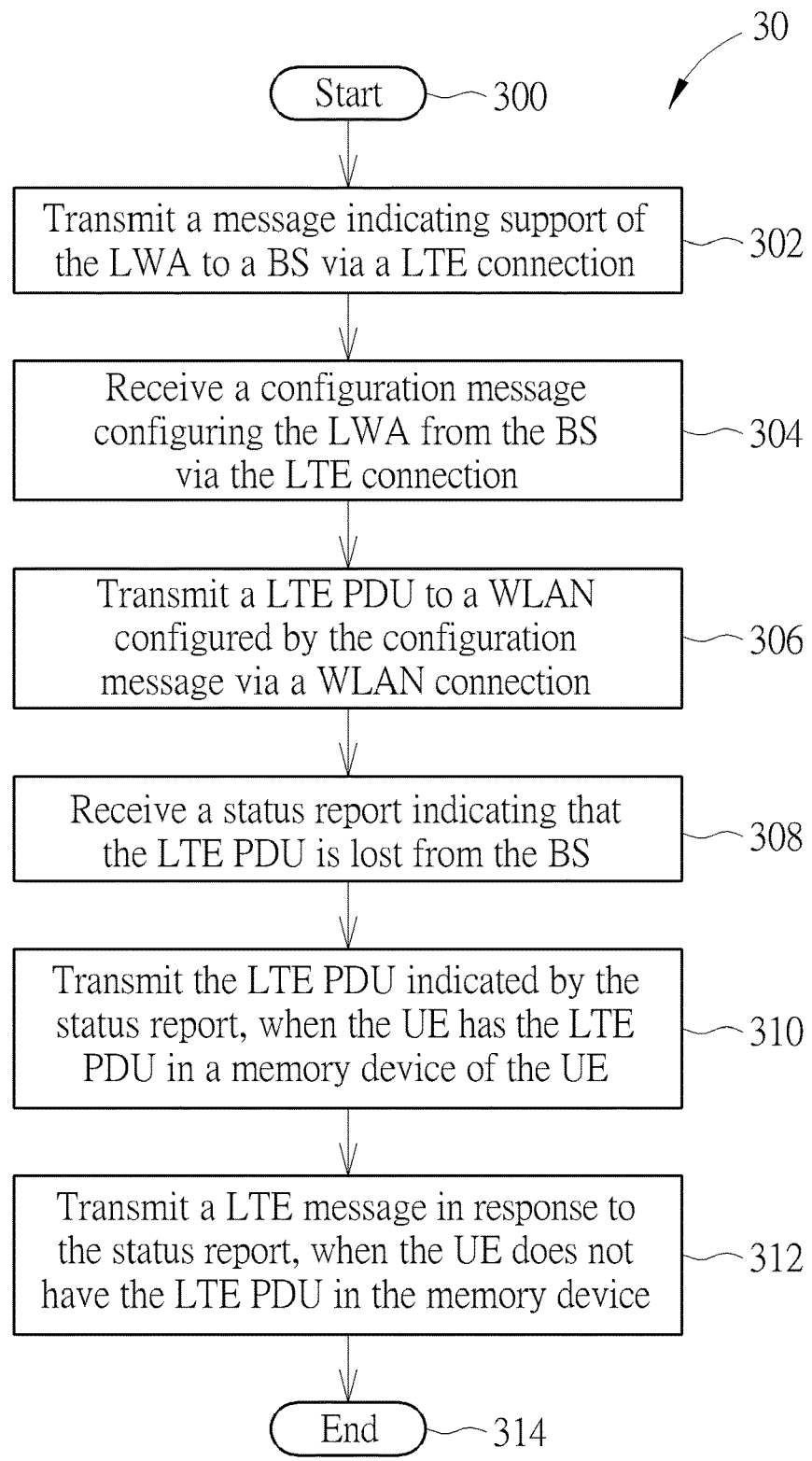
FIG. 3 is a flowchart of a process according to an example of the present invention.

FIG. 3 is a flowchart of a process 30 according to an example of the present invention. The process 30 may be utilized in a UE, to handle LWA. The process 30 includes the following steps:

Step 300: Start.
Step 302: Transmit a message indicating support of the LWA to a BS via a LTE connection.
Step 304: Receive a configuration message configuring the LWA from the BS via the LTE connection.
Step 306: Transmit a LTE PDU to a WLAN configured by the configuration message via a WLAN connection.
Step 308: Receive a status report indicating that the LTE PDU is lost from the BS.
Step 310: Transmit the LTE PDU indicated by the status report, when the UE has the LTE PDU in a memory device of the UE.
Step 312: Transmit a LTE message in response to the status report, when the UE does not have the LTE PDU in the memory device.
Step 314: End.

Realization of the process 30 is not limited to the above description. The following examples may be applied for realizing the process 30.

In one example, the UE may have the LTE PDU in its memory device, because the UE has not received a WLAN acknowledgement for acknowledging a reception of a WLAN medium access control (MAC) PDU including the LTE PDU. The UE may transmit the LTE message to the BS via the LTE connection or the WLAN via the WLAN connection in response to the status report. In one example, the UE may not have the LTE PDU in its memory device, because the UE has discarded (e.g., released) the LTE PDU from its memory device in response to a WLAN acknowledgement for acknowledging a reception of a WLAN MAC PDU including the LTE PDU. In other words, the UE discards the LTE PDU transmitted via the WLAN (i.e., free a storage of the LTE PDU in the memory device of the UE), when the UE receives a WLAN MAC acknowledgement for acknowledging a WLAN MAC PDU including the LTE PDU. When the BS receives the LTE message, the BS may stop transmitting the status report.

In one example, the configuration message (e.g., RRC-ConnectionReconfiguration) includes a Service Set Identifier (SSID) of the WLAN, a Basic Service Set Identifier (BSSID) of the WLAN, and/or a Homogeneous Extended Service Set Identifier (HESSID) of the WLAN.

In one example, the LTE PDU is a first Packet Data Convergence Protocol (PDCP) PDU including a first PDCP Service Data Unit (SDU) and a first sequence number (SN), and the LTE message is a second PDCP PDU including a second PDCP SDU and the first SN. That is, the LTE message has the same SN as the LTE PDU. In one example, the first SN is a PDCP SN. In one example, the first PDCP SDU and the second PDCP SDU are different. In one example, the second PDCP SDU includes octets dynamically generated by the UE or statically coded in the UE. In one example, the second PDCP PDU is a fake PDCP PDU.

In one example, the LTE message is a RRCConnectionReestablishmentRequest message for initiating a radio resource control (RRC) connection reestablishment procedure. That is, the UE initiates the RRC connection reestablishment procedure by transmitting the RRC connection reestablishment request message to the BS via the LTE connection. The UE may suspend a signaling radio bearer 1 (SRB1) and may suspend a first DRB which is a LWA bearer configured by the BS for the LWA and to which the LTE PDU belongs. The UE does not transmit any LTE PDU of the first DRB during the suspension. When the BS receives the RRC connection reestablishment request message, the BS transmits a RRCConnectionReestablishment message to the UE to recover a deadlock that the UE does not have the LTE PDU indicated by the status report. When the UE receives the RRC connection reestablishment message, the UE resumes the SRB1. The UE may transmit a RRCConnectionReestablishmentComplete message to the BS via the SRB1 in response to the RRC connection reestablishment message.

In one example, after the RRC connection reestablishment procedure, the BS initiates a RRC connection reconfiguration procedure by transmitting a RRCConnectionReconfiguration message to the UE to resume the first DRB. When the UE receives the RRC connection reconfiguration message, the UE resumes the first DRB and transmits a RRCConnectionReconfigurationComplete message to the BS. The UE reestablishes its PDCP entity (or layer) associated to the first DRB, in response to the RRC connection reestablishment procedure or the RRC connection reconfiguration procedure. The BS reestablishes its PDCP entity (or layer) associated to the first DRB, in response to the RRC connection reestablishment procedure or the RRC connection reconfiguration procedure. In the reestablishment, the UE resets a first transmission variable of the PDCP entity (or layer) in the UE to an initial value (e.g., 0), wherein the first transmission variable indicates a SN of a next PDCP PDU in the UE. In the reestablishment, the BS resets a first reception variable of the PDCP entity (layer) in the BS to the initial value, wherein the first reception variable indicates a next expected SN of a PDCP PDU received from the UE. In one example, the first transmission variable is "Next_PDCP_TX_SN" and the first reception variable is "Next_PDCP_RX_SN". Thus, the BS does not request the UE to retransmit the LTE PDU which is not in the memory device of the UE, after the reestablishment of its protocol (e.g., PDCP entity (or layer)) of the first DRB.

The UE may have a second DRB configured by the BS. The second DRB is not a LWA bearer (i.e., the second DRB uses the LTE only). The UE reestablishes its PDCP entity (or layer) associated to the second DRB, in response to the RRC connection reestablishment procedure or the RRC connection reconfiguration procedure. The BS reestablishes its PDCP entity (or layer) associated to the second DRB, in response to the RRC connection reestablishment procedure or the RRC connection reconfiguration procedure. In the reestablishment, the UE does not reset a second transmission variable of the PDCP entity (or layer) associated to the second DRB in the UE to an initial value (e.g., 0), wherein the second transmission variable indicates a SN of a next PDCP PDU transmitted by the UE. In the reestablishment, the BS does not reset a second reception variable of the PDCP entity (or layer) associated to the second DRB in the UE to the initial value, wherein the second reception variable indicates a next expected SN of a PDCP PDU received from the UE. In one example, the second transmission variable is "Next_PDCP_TX_SN" and the second reception variable is "Next_PDCP_RX_SN". In one example, the UE maintains (or keeps) the second transmission variable, and the BS maintains the second reception variable. That is, the UE determines to reset a transmission variable of a PDCP entity (or layer) associated to a DRB according to whether the DRB is a LWA bearer or not.

In one example, the LTE message is a message for indicating that the LTE PDU indicated by the status report is lost. That is, the UE transmits a message to notify the BS that the UE does not have the LTE PDU requested by the BS. When the BS receives the message, the BS knows that the LTE PDU is lost and stops transmitting the status report to the UE. In addition, the BS may shift (e.g., update or adjust) a receiving window of the PDCP entity associated to the first DRB without waiting for the LTE PDU. That is, when the BS receives the message, the BS considers that the LTE PDU is as if received. In one example, the receiving window may be a reordering window in a PDCP. The message may be a RRC message which is a "WLANConnectionStatusReport" or a new RRC message. In another example, the message may be a PDCP PDU. The PDCP PDU may include a field indicating that the LTE PDU indicated by the status report is lost. The PDCP PDU may be a PDCP control PDU or a PDCP Data PDU.

Figure 4:
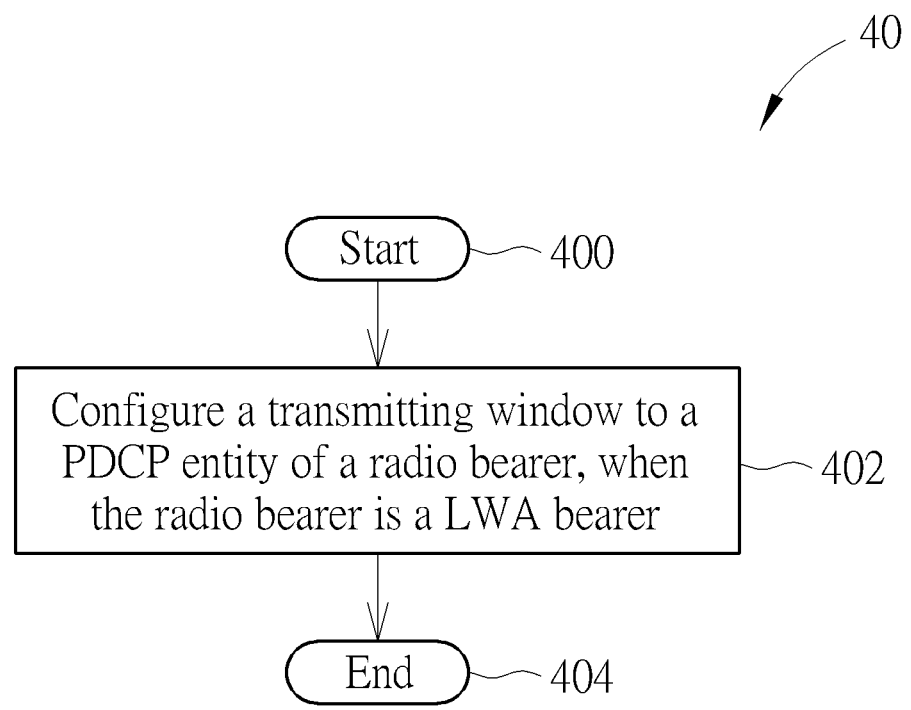
FIG. 4 is a flowchart of a process according to an example of the present invention.

FIG. 4 is a flowchart of a process 40 according to an example of the present invention. The process 40 may be utilized in a UE and/or in a BS, to handle LWA. The process 40 includes the following steps:

Step 400: Start.

Step 402: Configure a transmitting window to a PDCP entity of a radio bearer, when the radio bearer is a LWA bearer.

Step 404: End.

The UE may release (e.g., delete) a PDCP PDU of the PDCP entity when receiving a cellular acknowledgement indicating that the PDCP PDU is received. In one example, the BS transmits a RRC message including an information element configuring a transmitting window to the UE. In one example, a transmitting window size of the transmitting window is configured by the BS in a RRC message. In another example, the transmitting window size is predetermined in the third Generation Partnership Project (3GPP) standard (or specification). For example, the transmitting window size is 2048 when a 12 bit SN length is used, is 16384 when a 15 bit SN length is used, or is 131072 when 18 bit SN length is used, i.e., half of a PDCP SN size (e.g., space). The cellular acknowledgement may be a radio link control (RLC) acknowledgement, a PDCP acknowledgement, a PDCP status report, a LWAAP acknowledgment or a LWAAP status report.

In one example, when the transmitting window is used in the PDCP entity, the UE releases a PDCP PDU transmitted by the PDCP entity of the UE when receiving a cellular acknowledgement indicating that the PDCP PDU is received and the PDCP PDU is outside the transmitting window. In one example, the UE shifts the transmitting window, when a PDCP PDU with a lowest SN in the transmission window transmitted by the PDCP entity is acknowledged by a WLAN MAC acknowledgement and another (e.g., new) PDCP PDU outside the transmission window enters.

In one example, the BS transmits the LTE acknowledgement to the UE via the LTE connection or the WLAN connection. In one example, the BS transmits the LTE acknowledgement to the UE, when the BS receives a request from the UE via the LTE connection or the WLAN connection. For example, the request is a status report request and the LTE acknowledgement is the PDCP or LWA status report. The status report request is a PDCP control PDU or a poll bit in a PDCP data PDU. In one example, the BS transmits the PDCP or LWA status report to the UE periodically without the request. In one example, the BS transmits the PDCP or LWA status report to the UE without the status report request, when the BS determines that a receiving window has not been shifted for a duration or when the BS has a timer monitoring lost PDCP PDU(s) and the timer expires.

In one example, the UE/BS configures the transmitting window to a PDCP entity of a radio bearer, even when the radio bearer is not the LWA bearer. The description above is applied to the radio bearer.

In one example, the UE/BS does not configure the transmitting window to a PDCP entity of a radio bearer, when the radio bearer is not a LWA bearer. The UE determines not to use the transmitting window in a PDCP entity associated to a radio bearer, when the radio bearer is not a LWA bearer. In one example, when no transmitting window is used in the PDCP entity, the UE releases a PDCP PDU of the PDCP entity when receiving a RLC acknowledgement indicating that the PDCP PDU is received.

Figure 5:
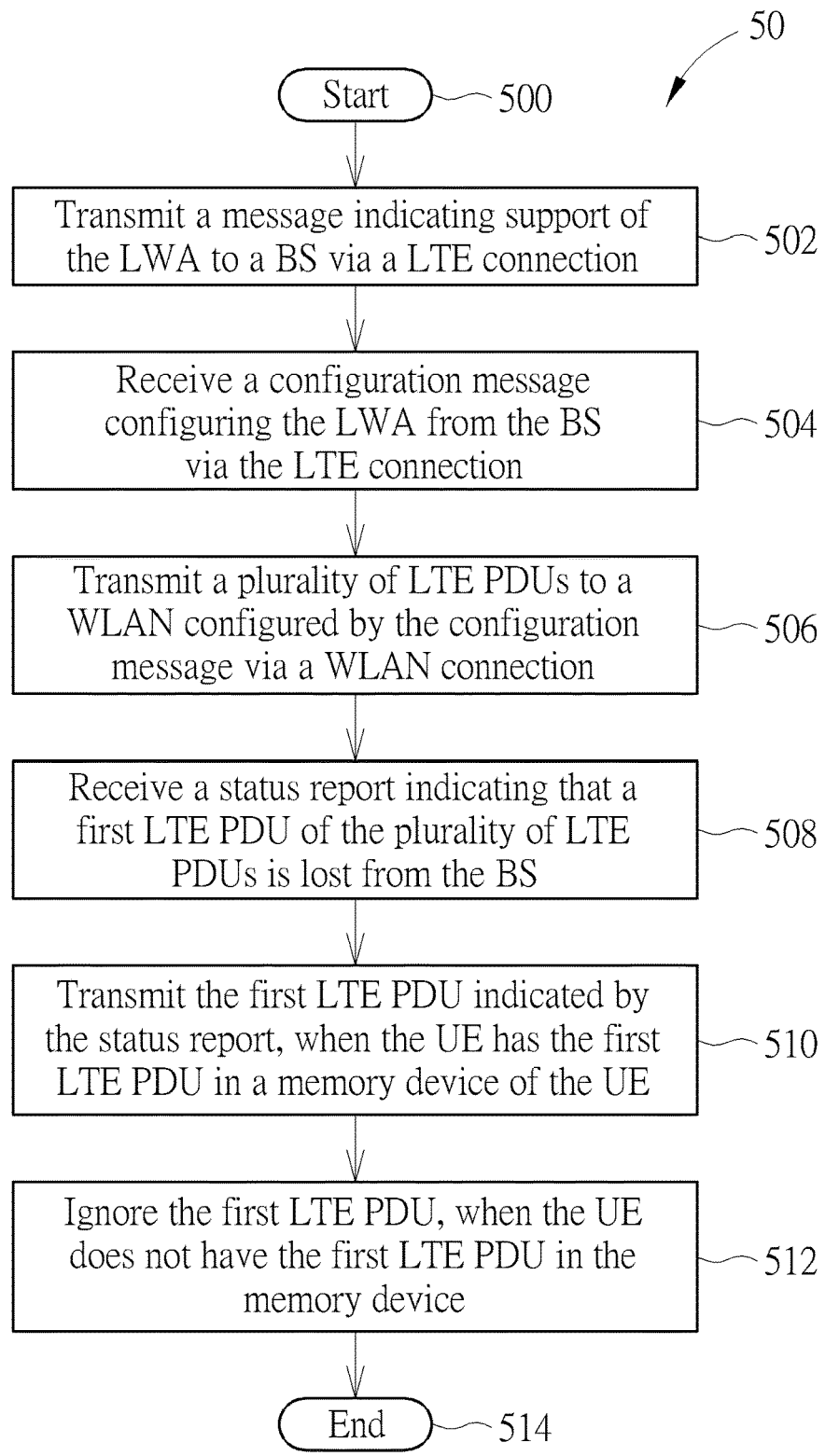
FIG. 5 is a flowchart of a process according to an example of the present invention.

FIG. 5 is a flowchart of a process 50 according to an example of the present invention. The process 50 may be utilized in a UE or in a BS, to handle LWA. The process 50 includes the following steps:

Step 500: Start.

Step 502: Transmit a message indicating support of the LWA to a BS via a LTE connection.

Step 504: Receive a configuration message configuring the LWA from the BS via the LTE connection.

Step 506: Transmit a plurality of LTE PDUs to a WLAN configured by the configuration message via a WLAN connection.

Step 508: Receive a status report indicating that a first LTE PDU of the plurality of LTE PDUs is lost from the BS.

Step 510: Transmit the first LTE PDU indicated by the status report, when the UE has the first LTE PDU in a memory device of the UE.

Step 512: Ignore the first LTE PDU, when the UE does not have the first LTE PDU in the memory device.

Step 514: End.

According to the process 50, the UE does not transmit the LTE message (e.g., a fake LTE PDU or a second LTE PDU including a SN in the first LTE PDU, the RRCConnectionReestablishmentRequest message or the message indicating the first LTE PDU is lost) in response to the indication of the first LTE PDU, when the UE does not have the first LTE PDU in the memory device. When the status report indicates a second LTE PDU of the plurality of LTE PDUs is lost and the UE has the second LTE PDU in the memory device of the UE, the UE may transmit the second LTE PDU to the BS. In other words, the UE does not consider the status report as invalid and does not ignore the status report. In one example, the UE may ignore the status report when all of lost LTE PDUs indicated by the status report are not in the memory device.

In one example, the configuration message (e.g. RRCConnectionReconfiguration) includes a SSID of the WLAN, a BSSID of the WLAN, and/or a HESSID of the WLAN. In one example, each of the plurality of LTE PDUs is a PDCP PDU including a PDCP SDU and a SN.

In one example, the UE does not have the first LTE PDU in the memory device as described above.

Figure 6:
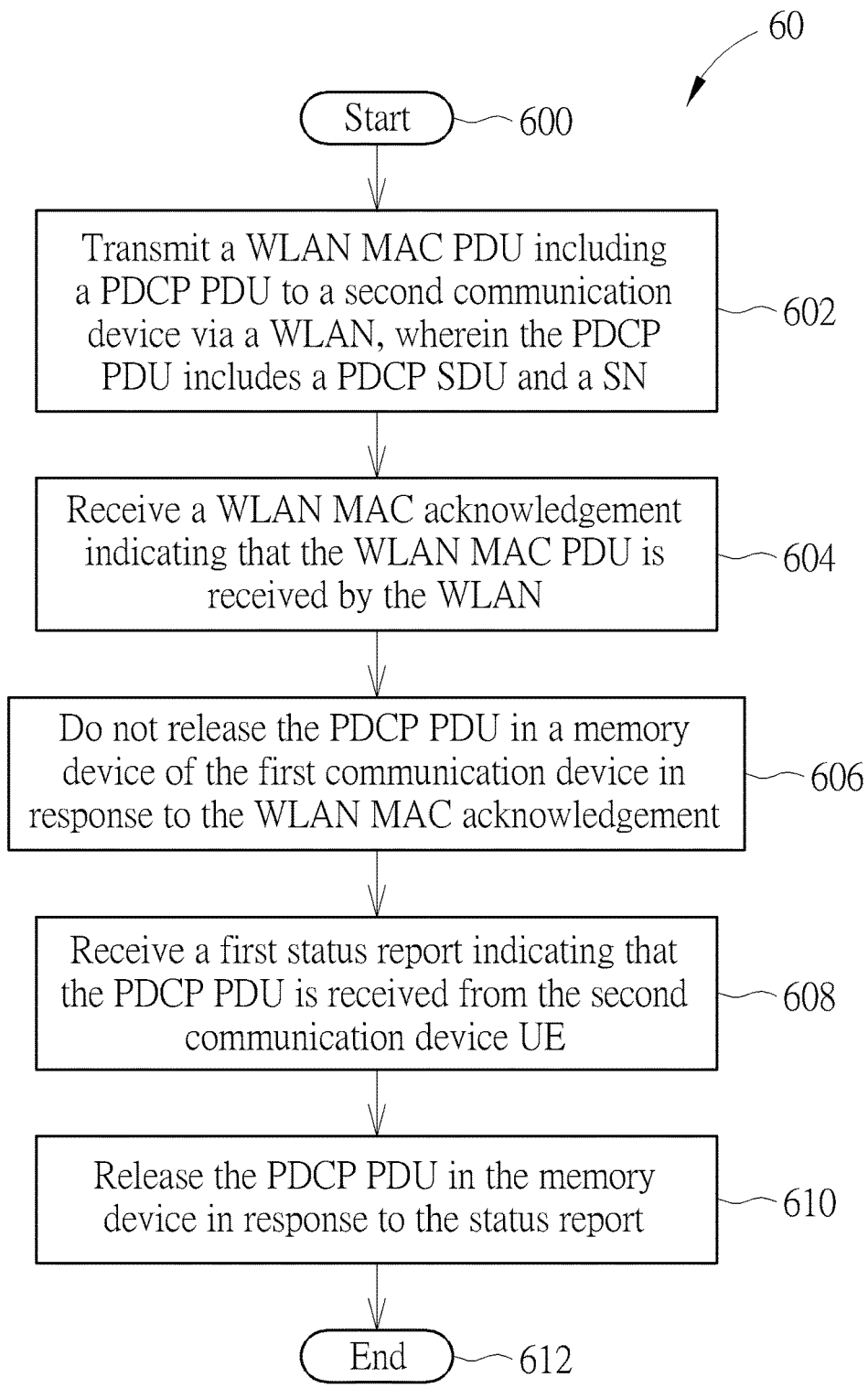
FIG. 6 is a flowchart of a process according to an example of the present invention.

FIG. 6 is a flowchart of a process 60 according to an example of the present invention. The process 60 may be utilized in a first communication device (e.g. a UE and/or in a BS), to handle LWA. The process 60 includes the following steps:

Step 600: Start.

Step 602: Transmit a WLAN MAC PDU including a PDCP PDU to a second communication device via a WLAN, wherein the PDCP PDU includes a PDCP SDU and a SN.

Step 604: Receive a WLAN MAC acknowledgement indicating that the WLAN MAC PDU is received by the WLAN.

Step 606: Do not release the PDCP PDU in a memory device of the first communication device in response to the WLAN MAC acknowledgement.

Step 608: Receive a first status report indicating that the PDCP PDU is received from the second communication device UE.

Step 610: Release the PDCP PDU in the memory device in response to the status report.

Step 612: End.

According to the process 60, when the first communication device receives a second status report indicating that the PDCP PDU is lost from the second communication device before receiving the first status report, the first communication device can transmit the PDCP PDU to the second communication device. Each of the first and second status report may be a PDCP or LWA status report.

In one example, the first communication device is the UE, and the second communication device is the BS. In another example, the first communication device is the BS, and the second communication device is the UE.

Description for the processes 30-50 may be applied to the process 60 and is not repeated herein.

Figure 7:
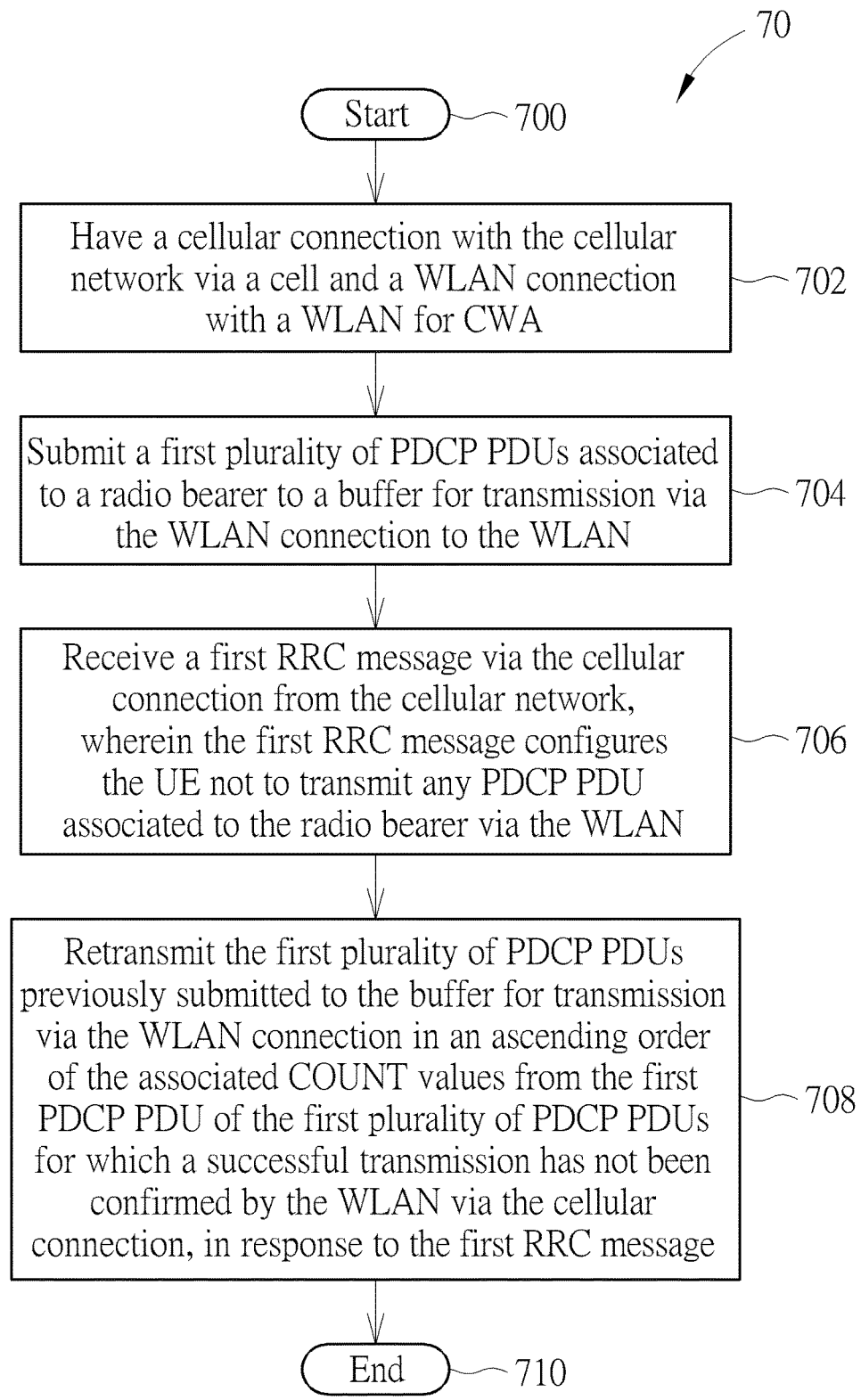
FIG. 7 is a flowchart of a process according to an example of the present invention.

FIG. 7 is a flowchart of a process 70 according to an example of the present invention. The process 70 may be utilized in a UE, to handle CWA. The process 70 includes the following steps:

Step 700: Start.

Step 702: Have a cellular connection with the cellular network via a cell and a WLAN connection with a WLAN for CWA.

Step 704: Submit a first plurality of PDCP PDUs associated to a radio bearer to a buffer for transmission via the WLAN connection to the WLAN.

Step 706: Receive a first RRC message via the cellular connection from the cellular network, wherein the first RRC message configures the UE not to transmit any PDCP PDU associated to the radio bearer via the WLAN.

Step 708: Retransmit the first plurality of PDCP PDUs previously submitted to the buffer for transmission via the WLAN connection in an ascending order of the associated COUNT values from the first PDCP PDU of the first plurality of PDCP PDUs for which a successful transmission has not been confirmed by the WLAN via the cellular connection, in response to the first RRC message.

Step 710: End.

In one example, when a LTE modem of the UE has an interface with a WLAN (e.g., WiFi) modem of the UE, the LTE modem knows whether the first plurality of PDCP PDUs have been transmitted successfully by the WLAN modem. That is, the WLAN modem confirms whether the first plurality of PDCP PDUs have been transmitted successfully to the LTE modem by using the interface. Then, the UE performs retransmission of the first plurality of PDCP PDUs which was submitted to the WLAN modem for transmission to the WLAN in response to the first RRC message. In one example, the interface is a physical connection, e.g., general-purpose input/output (GPIO), universal serial Bus (USB), universal asynchronous receiver/transmitter (UART), shared memory, etc. connecting the WLAN modem and the LTE modem. In another example, the interface is an application processor connecting the WLAN modem and LTE modem. That is, the WLAN modem confirms whether the PDCP PDU have been transmitted successfully to the WLAN to the LTE modem via the application processor.

In step 704, the UE may or may not transmit at least one of the first plurality of PDCP PDUs in the buffer via the WLAN connection, before receiving the first RRC message.

Figure 8:
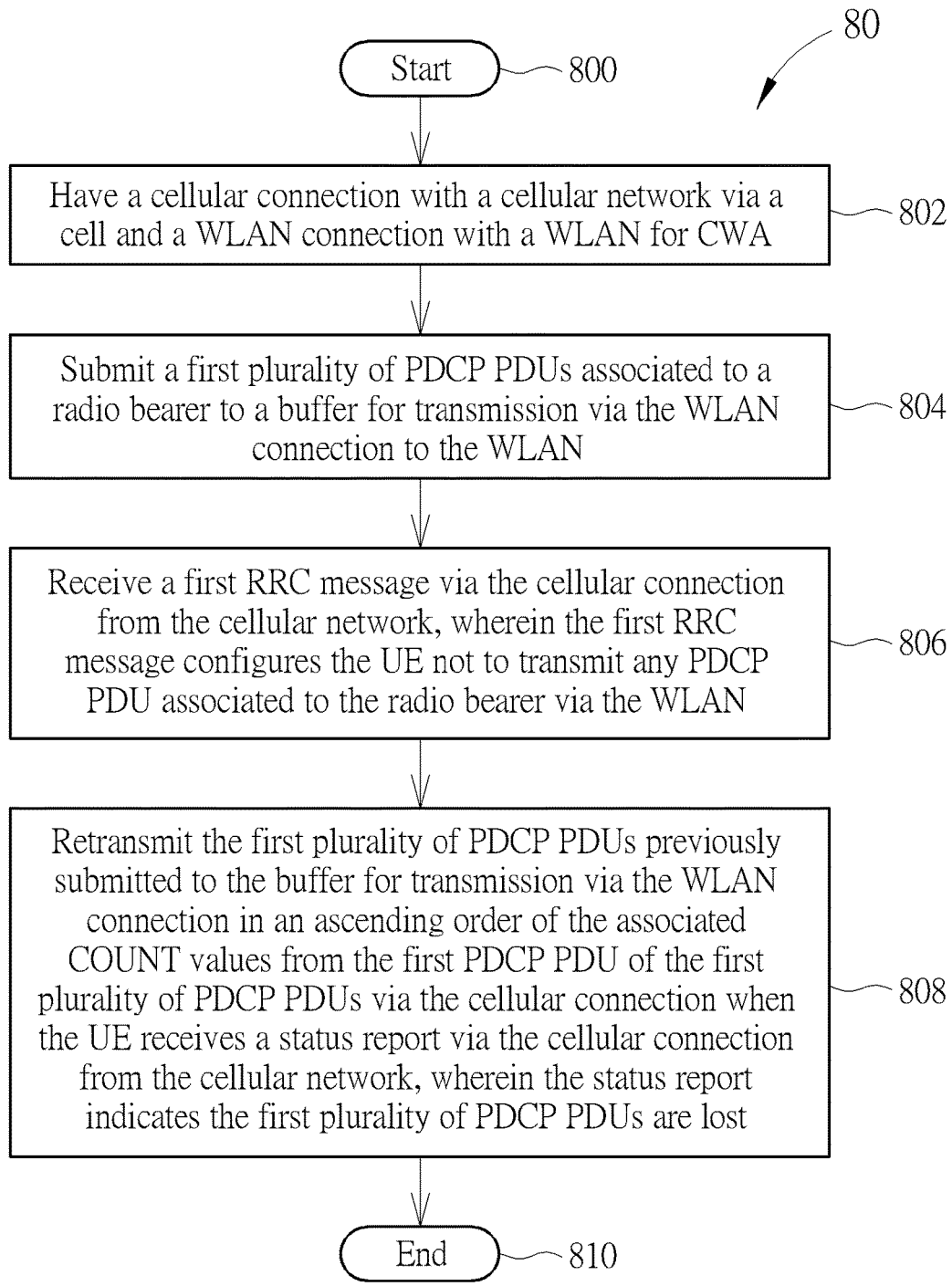
FIG. 8 is a flowchart of a process according to an example of the present invention.

FIG. 8 is a flowchart of a process 80 according to an example of the present invention. The process 80 may be utilized in a UE, to handle CWA. The process 80 includes the following steps:

Step 800: Start.

Step 802: Have a cellular connection with a cellular network via a cell and a WLAN connection with a WLAN for CWA.

Step 804: Submit a first plurality of PDCP PDUs associated to a radio bearer to a buffer for transmission via the WLAN connection to the WLAN.

Step 806: Receive a first RRC message via the cellular connection from the cellular network, wherein the first RRC message configures the UE not to transmit any PDCP PDU associated to the radio bearer via the WLAN.

Step 808: Retransmit the first plurality of PDCP PDUs previously submitted to the buffer for transmission via the WLAN connection in an ascending order of the associated COUNT values from the first PDCP PDU of the first plurality of PDCP PDUs via the cellular connection when the UE receives a status report via the cellular connection from the cellular network, wherein the status report indicates the first plurality of PDCP PDUs are lost.

Step 810: End.

According to the process 80, the UE does not retransmit the first plurality of PDCP PDUs previously submitted to the buffer for transmission via the WLAN connection in an ascending order of the associated COUNT values from the first PDCP PDU of the first plurality of PDCP PDUs for which a successful transmission has not been confirmed, in response to the first RRC message. Instead, the UE retransmits the first plurality of PDCP PDUs, when the UE receives a status report via the cellular connection from the cellular network and the status report indicates that the first plurality of PDCP PDUs are lost. If the status report does not indicate any PDCP PDU is lost, the UE does not transmit the first plurality of PDCP PDUs.

The process 80 solves a problem that when a LTE modem of the UE does not have an interface with a WLAN modem of the UE, the LTE modem does not know whether the first plurality of PDCP PDUs have been transmitted successfully by the WLAN modem. Thus, it avoids unnecessary retransmission which wastes cellular radio resources.

In step 804, the UE may or may not transmit at least one of the first plurality of PDCP PDUs in the buffer via the WLAN connection, before receiving the first RRC message.

In one example, the status report is a PDCP or a LWA status report. Description for the processes 30-60 may be applied to the process 80 and is not repeated herein.

Realization of the processes 70-80 is not limited to the above description. The following examples may be applied for realizing the processes 70-80.

In one example, the first RRC message is a first RRC-ConnectionReconfiguration message. The UE receives a second RRC message (e.g., RRCConnectionReconfiguration message) configuring the CWA for the radio bearer from the cellular network and the UE performs the CWA for the radio bearer in response to the second RRC message. That is, the second RRC message configures the radio bearer to be a CWA bearer. The first RRC message is used to configure the radio bearer to be a cellular only radio bearer.

In one example, the cellular connection includes that the UE and the cellular network communicates (e.g., communicating) with each other by using cellular radio resources. The WLAN connection may include that the UE and the WLAN communicates (e.g., communicating) with each other by using WLAN radio resource sources. The UE performs an association procedure with the WLAN to establish the WLAN connection.

In one example, the UE transmits a second plurality of PDCP PDUs via the cellular connection to the cellular network during the CWA. The UE retransmits the second plurality of PDCP PDUs previously for which the successful transmission has not been confirmed by a lower layer (e.g., RLC), in response to the first RRC message.

Figure 9:
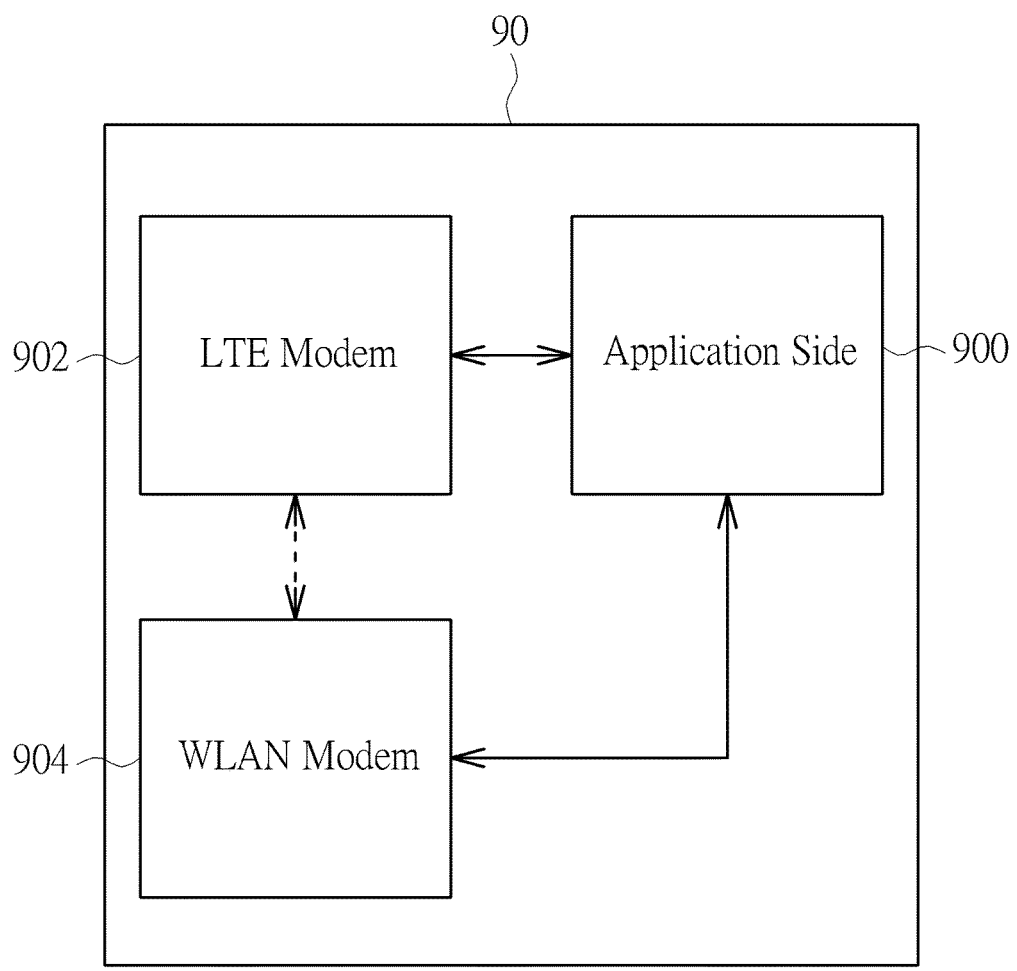
FIG. 9 is a schematic diagram of a UE according to an example of the present invention.

FIG. 9 is a schematic diagram of a UE 90 (e.g., the communication device 100 in FIG. 1) according to an example of the present invention. The UE 90 includes an application side 900, a LTE modem 902 and a WLAN (e.g., WiFi) modem 904. In FIG. 9, there is a physical connection (e.g., bidirectional arrow) between the application side 900 and the LTE modem 902, and there is a physical connection between the application side 900 and the WLAN modem 904. That is, the application side 900 communicates with the LTE modem 902 and the WLAN modem 904. In one example, there is a physical connection between the LTE modem 902 and the WLAN modem 904. That is, the LTE modem 902 and the WLAN modem 904 communicate with each other directly (e.g., via the dotted line in FIG. 9). In another example, there is no physical connection between the LTE modem 902 and the WLAN modem 904. That is, the LTE modem 902 and the WLAN modem 904 communicate with each other indirectly (e.g., via the application side 900). In FIG. 9, examples of the physical connection between any two of the application side 900, LTE modem 902 and WLAN modem 904 may be any physical interface such as shared memory, USB, GPIO, UART, etc.

In above processes and examples, the "LTE" may be replaced by "5G" or "cellular", and the "LWA" may be replaced by a "5GWA". The CWA may be replaced by the "LWA" or the "5GWA". The "PDCP" may be replaced by the "LWAAP", and the "LWAAP" may be replaced by a "5GWA Adaptation Protocol (5GWAAP)".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20. Any of the abovementioned processes may be compiled into the program code 214.

To sum up, the present invention provides a method and related communication device for handling LWA. Accordingly, the UE knows how to handle the status report when the UE does not have the LTE data indicated by the status report. Thus, the BS does not keep notifying the UE. As a result, the problem of unnecessary retransmission and a deadlock are solved.

What is claimed is:

1. A communication device of handling aggregation of cellular network and Wireless Local Area Network (WLAN) (CWA), comprising:
   a storage device; and
   a processing circuit, coupled to the storage device, wherein the storage device stores, and the processing circuit is configured to execute instructions of:
   transmitting a message indicating support of the CWA to a base station (BS) via a cellular connection;
   receiving a configuration message configuring the CWA from the BS via the cellular connection;
   transmitting a cellular protocol data unit (PDU) to a WLAN configured by the configuration message via a WLAN connection;
   receiving a status report indicating that the cellular PDU is lost from the BS;

transmitting the cellular PDU indicated by the status report, when the communication device has the cellular PDU in a memory device of the communication device;

transmitting a cellular message in response to the status report, when the communication device does not have the cellular PDU in the memory device; and ignoring the status report when all of lost LTE PDUs indicated by the status report are not in the memory device.

2. The communication device of claim 1, wherein the configuration message comprises a Service Set Identifier (SSID) of the WLAN, a Basic Service Set Identifier (BSSID) of the WLAN, and/or a Homogeneous Extended Service Set Identifier (HESSID) of the WLAN.

3. The communication device of claim 1, wherein the cellular PDU is a first Packet Data Convergence Protocol (PDCP) PDU comprising a first PDCP Service Data Unit (SDU) and a first sequence number, and the cellular message is a second PDCP PDU comprising a second PDCP SDU and the first sequence number.

4. The communication device of claim 3, wherein the first PDCP SDU and the second PDCP SDU are different.

5. The communication device of claim 3, wherein the second PDCP PDU is a fake PDCP PDU.

6. The communication device of claim 1, wherein the cellular message is a RRCConnectionReestablishmentRequest message for initiating a RRC connection reestablishment procedure.

7. The communication device of claim 1, wherein the cellular message is a message for indicating that the cellular PDU indicated by the status report is lost.

8. A communication device of handling aggregation of cellular network and Wireless Local Area Network (WLAN) (CWA), comprising:
- a storage device; and
- a processing circuit, coupled to the storage device, wherein the storage device stores, and the processing circuit is configured to execute instructions of:
- configuring a transmitting window to a Packet Data Convergence Protocol (PDCP) entity of a radio bearer, when the radio bearer is a CWA bearer;
- releasing a PDCP PDU transmitted by the PDCP entity, when receiving a cellular acknowledgement indicating that the PDCP PDU is received and the PDCP PDU is outside the transmitting window; and
- shifting the transmitting window, when a first PDCP PDU with a lowest sequence number in the transmitting window transmitted by the PDCP entity is acknowledged by a WLAN Medium Access Control (MAC) acknowledgement and a second PDCP PDU enters the transmission window, wherein the second PDCP PDU is outside the transmitting window.

9. The communication device of claim 8, wherein a transmitting window size of the transmitting window is configured by a base station (BS) in a radio resource control (RRC) message, or is predetermined in the third Generation Partnership Project (3GPP) standard.

10. A communication device of handling aggregation of cellular network and Wireless Local Area Network (WLAN) (CWA), comprising:
- a storage device; and
- a processing circuit, coupled to the storage device, wherein the storage device stores, and the processing circuit is configured to execute instructions of:
- transmitting a message indicating support of the CWA to a base station (BS) via a cellular connection;
- receiving a configuration message configuring the CWA from the BS via the cellular connection;
- transmitting a plurality of cellular protocol data units (PDUs) to a WLAN configured by the configuration message via a WLAN connection;
- receiving a status report indicating that a first cellular PDU of the plurality of cellular PDUs is lost from the BS;
- transmitting the first cellular PDU indicated by the status report, when the communication device has the first cellular PDU in a memory device of the communication device;
- ignoring the first cellular PDU, when the communication device does not have the first cellular PDU in the memory device; and
- ignoring the status report when all of lost LTE PDUs indicated by the status report are not in the memory device.

11. The communication device of claim 10, wherein the configuration message comprises a Service Set Identifier (SSID) of the WLAN, a Basic Service Set Identifier (BSSID) of the WLAN, and/or a Homogeneous Extended Service Set Identifier (HESSID) of the WLAN.

12. The communication device of claim 10, wherein each of the plurality of cellular PDUs is a Packet Data Convergence Protocol (PDCP) PDU comprising a PDCP Service Data Unit (SDU) and a sequence number.

13. The communication device of claim 10, wherein the communication device ignores the first cellular PDU by not transmitting a cellular message in response to the status report, wherein the cellular message is a cellular PDU including a sequence number (SN) of the first cellular PDU, a RRCConnectionReestablishmentRequest message or indicates the first cellular PDU is lost.

* * * * *